United States Patent [19]

Nanba

[11] Patent Number: 4,872,062
[45] Date of Patent: Oct. 3, 1989

[54] METHOD FOR EFFICIENTLY DROPPING OUT A PATTERN HAVING A DROP-OUT COLOR AND A FACSIMILE APPARATUS FOR REALIZING THE SAME

[75] Inventor: Hiromi Nanba, Tokorozawa, Japan

[73] Assignee: Kabushiki Kaisha Toshiba, Kawasaki, Japan

[21] Appl. No.: 232,773

[22] Filed: Aug. 16, 1988

[30] Foreign Application Priority Data

Aug. 28, 1987 [JP] Japan .................. 62-214323

[51] Int. Cl.$^4$ ............................................. H04N 1/40
[52] U.S. Cl. ..................................... 358/443; 358/75;
358/464; 235/468
[58] Field of Search ............... 358/294, 280, 282, 908;
382/17; 235/465, 468, 469, 491

[56] References Cited

U.S. PATENT DOCUMENTS

| | | | |
|---|---|---|---|
| 3,784,832 | 1/1974 | Sewell | 235/469 |
| 4,180,798 | 12/1979 | Komori et al. | 358/263 |
| 4,322,157 | 3/1982 | Miura et al. | 358/280 |
| 4,654,723 | 3/1987 | Nagans | 358/293 |
| 4,795,894 | 1/1989 | Sugimoto et al. | 235/468 |
| 4,811,416 | 3/1989 | Nakamura | 358/280 |

Primary Examiner—Edward L. Coles, Sr.
Assistant Examiner—Kim Yen Vu
Attorney, Agent, or Firm—Foley & Lardner, Schwartz, Jeffery, Schwaab, Mack, Blumenthal & Evans

[57] ABSTRACT

A facsimile apparatus comprises first and second lamps and a controller. The controller selectively sends a first control signal to the first lamp and a second control signal to the second lamp in accordance with whether or not a data sheet contains a pattern described in a drop-out color. The first lamp emits first light having a first wavelength characteristic in accordance with the incoming first control signal. The second lamp emits second light having a second wavelength characteristic different from the first wavelength characteristic in accordance with the incoming second control signal.

16 Claims, 6 Drawing Sheets

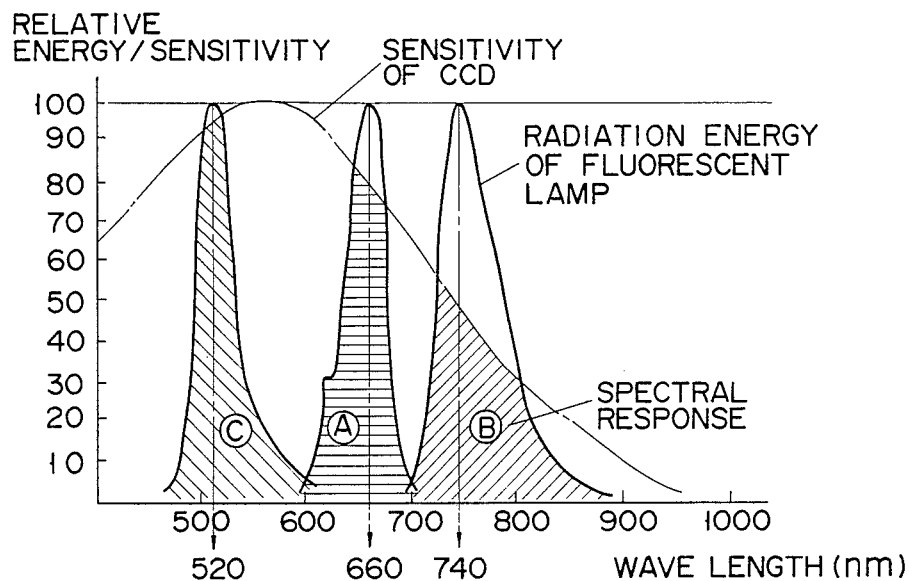
F I G. 5
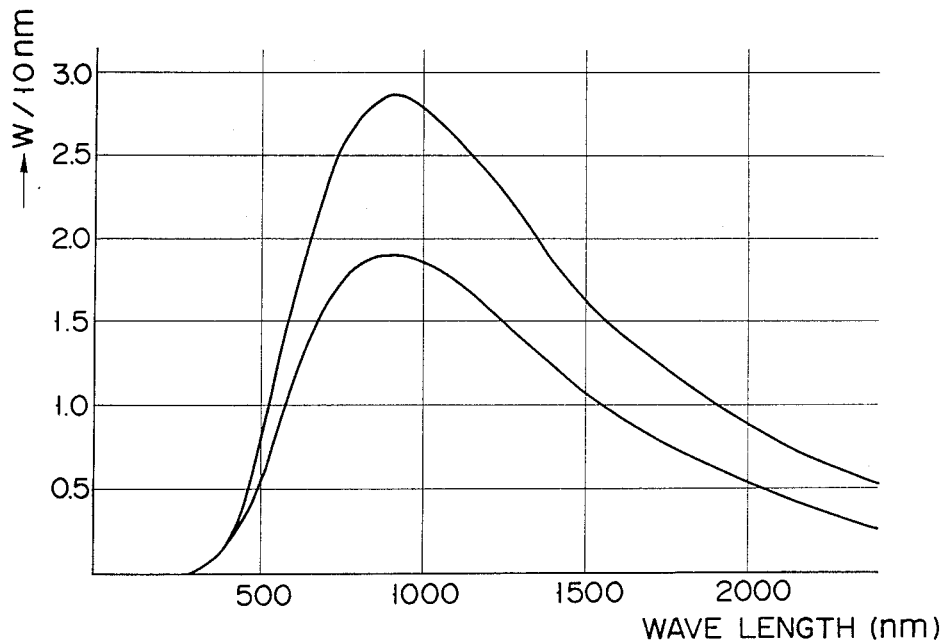
F I G. 6

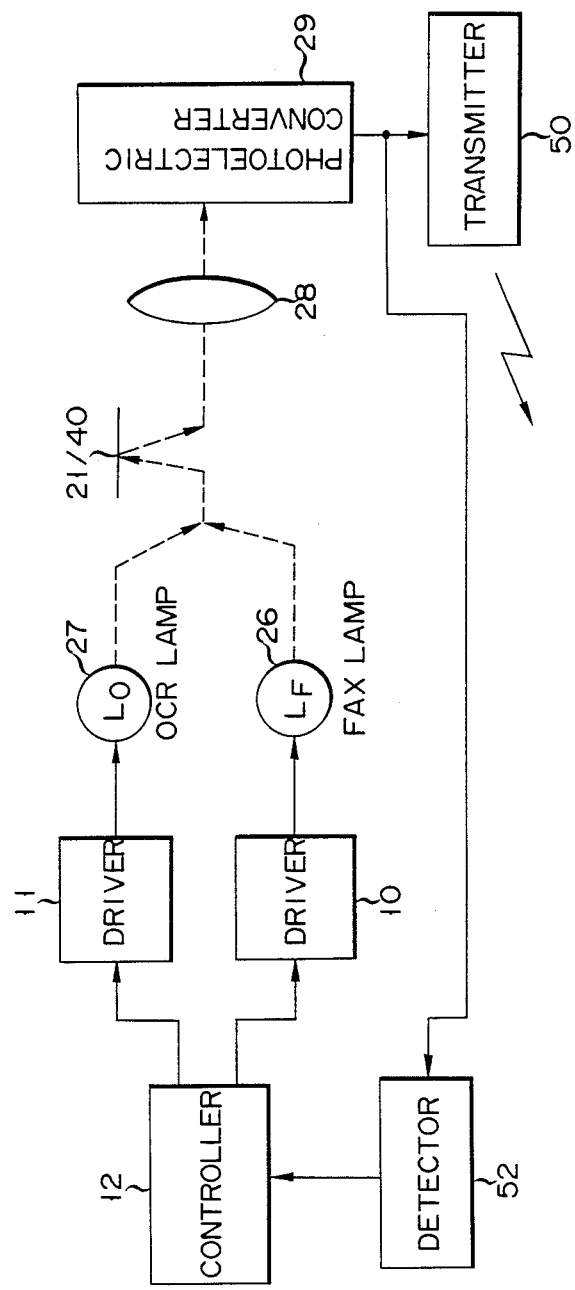
F I G. 7

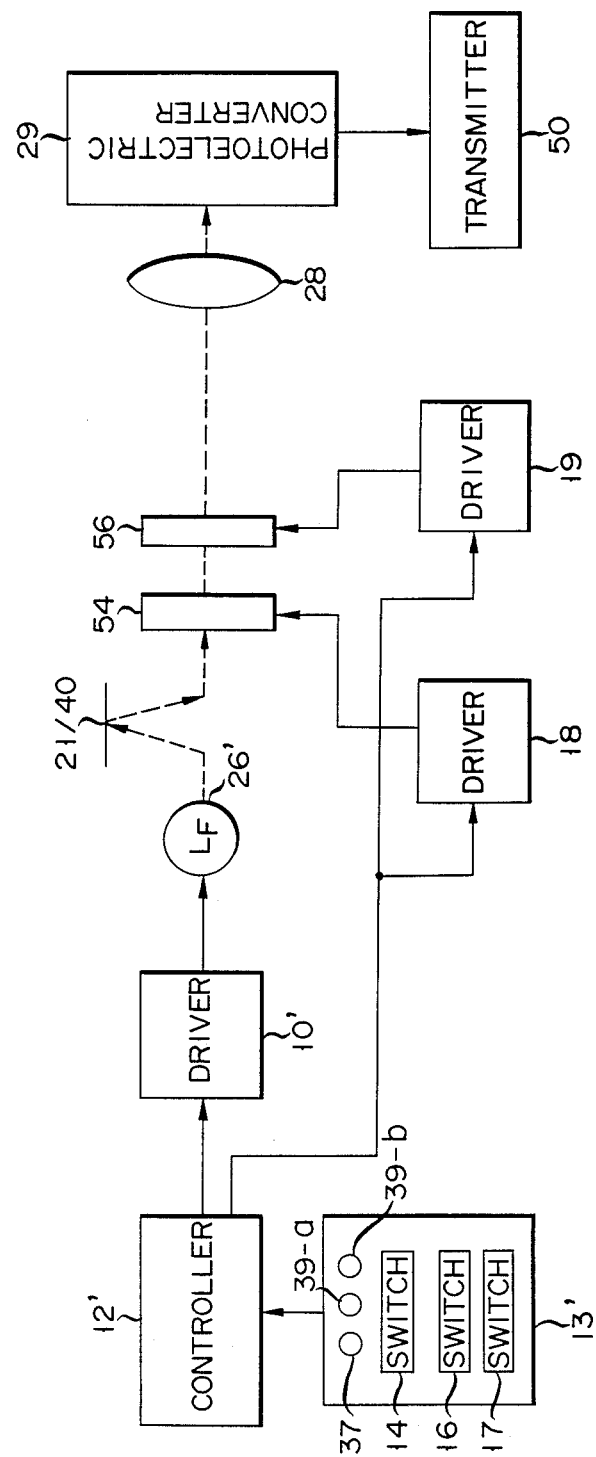
F I G. 8

METHOD FOR EFFICIENTLY DROPPING OUT A PATTERN HAVING A DROP-OUT COLOR AND A FACSIMILE APPARATUS FOR REALIZING THE SAME

BACKGROUND OF THE INVENTION

1. Field of the Invention

The present invention relates to a facsimile apparatus for use in a FAX/OCR (Facsimile Apparatus/Optical Character Reader) system, and, more particularly, to a method for efficiently dropping out a pattern having a drop-out color and a FAX for realizing the method.

2. Description of the Related Art

According to a conventional FAX, characters and diagrams recorded on a sheet of paper are converted into image data for transmission to a destination FAX. Characters and diagrams, on the other hand, are reproduced from received image data. In a conventional OCR, characters are recognized from image data.

Recently, a FAX/OCR system which utilizes such a FAX and OCR, have been developed. In this system, image data transmitted from a terminal FAX is received by a center FAX and is then subjected to a character recognition process in a center OCR. In the terminal FAX of the system light from a light source is scanned over a data sheet to read characters recorded on the sheet and reflection light from the sheet is photoelectrically converted into image data which is transmitted. To execute the character recognition of the received image data in the OCR, a character writing frame of a data sheet, which is specified in unit of data sheet, must not influence the recognition process. In other words, such a character writing frame needs to be printed in a drop-out color which is not read by the FAX.

The light source of a FAX generally has spectrum close to the visibility of a human being. Therefore, when such a light source is used, a character writing frame must be printed in a color difficult for a person to see, thus making it difficult to write characters in the character writing frame. If clearer color is used, the character frame is undesirably read out without any drop-out when scanned, which may significantly hinder the character recognition process.

SUMMARY OF THE INVENTION

It is an object of this invention to provide a method for assuredly dropping out a character writing frame on a data sheet in a FAX/OCR system, and transmitting the image data, corresponding to data on the data sheet, that can be assuredly subjected to the character recognition process, and to provide a facsimile apparatus for realizing the method.

The facsimile apparatus comprises a first lamp, a second lamp and a controller. The controller selectively outputs a first control signal to the first lamp and a second control signal to the second lamp, in accordance with whether or not a data sheet contains a pattern having a drop-out color. The first lamp emits first light having a first wavelength characteristic in accordance with the received first control signal, and the second lamp emits second light having a second wavelength characteristic different from the first one in accordance with the received second control signal.

The existence of a pattern having the drop-out color on the data sheet can be detected from image data acquired by photoelectric conversion of the reflection light from the sheet; instead, it may be manually inputted.

In the facsimile apparatus, the first lamp may have a broad wavelength band and the second lamp may be replaced by a filter that shields light with a wavelength band of the drop-out color.

The method for achieving the above object comprises selectively generating one of first and second control signals in accordance with whether or not a data sheet contains a pattern described in a drop-out color, emitting first light having a first wavelength characteristic in accordance with the first control signal and emitting second light having a second wavelength characteristic different from the first wavelength characteristic in accordance with the second control signal.

According to this invention, as described above, in scanning data on a data sheet containing a character writing frame printed in a drop-out color, the character writing frame is dropped out and only image data needed for a character recognition process can be assuredly transmitted. Further, the drop-out color need not be set to be hard for a person to see, so that the necessary data can be surely filled in the character writing frame printed in the drop-out color. In addition, since the character writing frame printed in the drop-out color is not read out, the compressing efficiency for image data can be improved and the required transmission time can be reduced.

BRIEF DESCRIPTION OF THE DRAWINGS

FIGS. 5 and 6 are graphs illustrating spectrums of a light source used in this invention;

FIG. 7 is a block diagram illustrating a partial arrangement of a facsimile according to a second embodiment of this invention and FIG. 8 is a block diagram illustrating a partial arrangement of a facsimile according to a third embodiment of this invention.

DETAILED DESCRIPTION OF THE PREFERRED EMBODIMENT

A facsimile apparatus according to this invention will be described in detail below with reference to the accompanying drawings.

Figure 3:
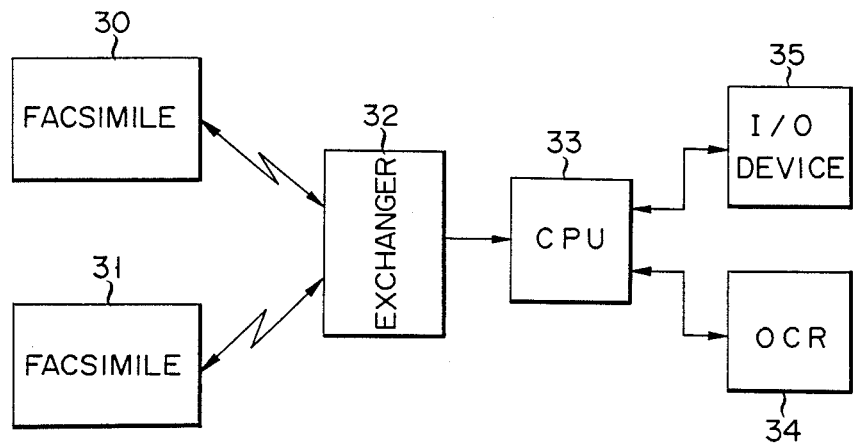
FIG. 3 is a block diagram illustrating the arrangement of a FAX/OCR system according to the embodiment.

As shown in FIG. 3, a FAX/OCR system employing a facsimile apparatus according to this invention comprises an exchanger 32 for receiving image data transmitted from individual facsimile apparatuses 30 and 31. This exchanger 32 transfers the received image data to CPU 33 which in turn stores the data in a memory (not shown). The image data is sent to optical character reader (OCR) 34 when a character recognition process is needed. OCR 34 executed the character recognition process and outputs the processing result to CPU 33. Input/output (I/0) device 35 displays the recognition result from OCR 34 in accordance with the output of CPU 33 and allows for an operator to perform an input operation needed for correction in the case where the image data cannot be recognized.

Figure 1:
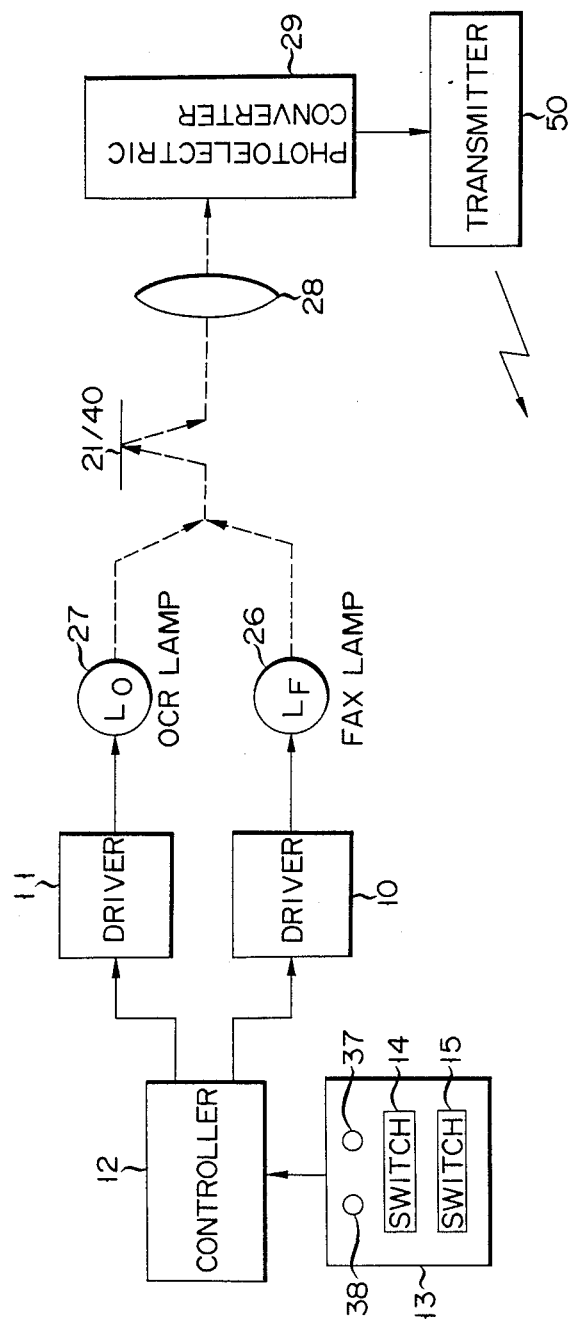
FIG. 1 is a block diagram illustrating a partial arrangement of a facsimile apparatus according to a first embodiment of this invention.
Figure 2:
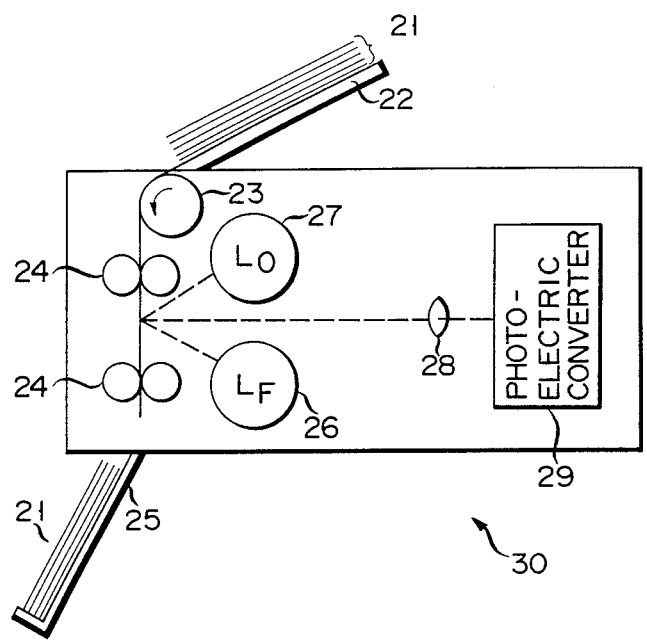
FIG. 2 is a conceptual diagram illustrating the arrangement of a scanning system of the facsimile apparatus of the same embodiment.

Referring now to FIGS. 1 and 2, a facsimile apparatus according to the first embodiment of this invention will be explained.

As shown in FIG. 2, facsimile apparatus 30 comprises hopper 22 for supporting a stack of data sheets 21, feed roller 23 for loading data sheets 21 from hopper 22 in apparatus 30 one by one, conveying rollers 24 for feeding data sheets 21 and stacker 25 for receiving data sheets 21 which have been put through a character reading process. Inside facsimile apparatus 30 are general FAX lamp $L_F 26$, OCR lamp $L_O 27$, image focusing lens 28 and photoelectric converter 29. Each data sheet contains a pattern having a drop-out color. $L_F 26$ has a spectrum in a visible region, while lamp $L_O 27$ has a spectrum outside a wavelength region corresponding to the drop-out color, and suitable for a the normal OCR operation.

A lamp having the wavelength characteristic indicated, for example, by the curve C in FIG. 5 serves as lamp $L_F 26$, and its peak wavelength lies at the green region. In contrast, a lamp having the wavelength characteristic indicated either by the curve A or B in FIG. 5 serves as OCR lamp $L_O 27$. Lamp A has a peak wavelength at the red region while lamp B has it at the near infrared region. A drop-out color suitable for lamp A or B is the one in the reddish-amber region or red region.

Facsimile apparatus 30, as shown in FIG. 1, comprises drivers 10 and 11 for respectively driving lamps $L_F 26$ and $L_O 27$. These drivers 10 and 11 are controlled in accordance with FAX and OCR control signals sent from controller 12, respectively. These control signals are selectively output to the drivers in accordance with the switching operation of switches 14 and 15 provided on operation panel 13. This operation panel 13 is further provided with light-emitting diodes 37 and 38 in association with lamps $L_F 26$ and $L_O 27$.

The operation of this embodiment will be explained below. First, in the normal FAX mode, in response to the operation of switch 14 of sender facsimile apparatus 30, controller 12 outputs the FAX control signal to cause driver 10 to turn on the lamp $L_F 26$. Original 21 as a data sheet is fed in apparatus 30 by feed roller 23 and conveying rollers 24 and is then scanned with light from lamp $L_F 26$. Photoelectric converter 29 executes photoelectric conversion of the light which is reflected by the data sheet and collected by lens 28 to provide line image data. This line image data is then transferred over a line to exchanger 32 by transmitter 50. Exchanger 32 transfers the line image data from sender facsimile apparatus 30 to receiver facsimile apparatus 31. Receiver facsimile apparatus 31 reproduces image data corresponding to the original from the received line image data.

Figure 4:
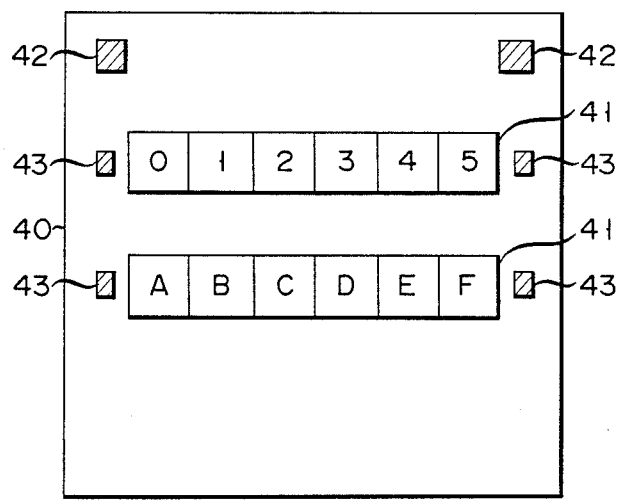
FIG. 4 is a diagram exemplifying a slip for use in the embodiment.

In the character recognition mode, for example, slip 40 as shown in FIG. 4 is used as a data sheet. In accordance with the line image data of slip 40 sent from facsimile apparatus 30, receiver OCR 34 performs the character recognition process.

More specifically, in accordance with the operation of switch 15 of facsimile apparatus 30, controller 12 outputs the OCR control signal to cause driver 11 to turn on OCR lamp $L_O 27$. When slip 40 is mounted on hopper 22, it is fed inside apparatus 30 by feed roller 23 and conveying rollers 24. Slip 40 has characters written within character writing frame 41 printed in the drop-out color, and further has reference mark 42 and line mark 43 printed in the drop-out color. Reference mark 42 is necessary for compensation, such as skew and enlargement/reduction, and line mark 43 is necessary for detection for a line position. Slip 40 is scanned with light from lamp $L_O 27$, and photoelectric converter 29 performs photoelectric conversion of the reflection light of lamp $L_O 27$ to provide line image data. In this case, due to the wavelength characteristic of lamp $L_O 27$, the character writing frame printed in the drop-out color is dropped out at the time of the photoelectric conversion. The line image data is sent over a line to exchanger 32.

Exchanger 32 transfers the line image data from facsimile apparatus 30 to CPU 33, which is stored in a memory. Exchanger 32 may, at the same time, transfer the line image data to facsimile apparatus 31. When the line image data for one sheet is received, CPU 33 sends it from the memory to OCR 34, which in turn sequentially detects and takes out image data within character writing frame 41 from the received image data. Based on the taken-out image data, a character recognition process for each character is executed and the recognition result is sent to CPU 33 to provide character codes. I/0 device 35 displays characters corresponding to the character codes sent from CPU 33.

In this FAX/OCR system, in this manner, lamp $L_O 27$ can be selectively driven when data written on the slip is necessary for the character recognition process. Thus, character writing frame 41 printed in the drop-out color can be dropped out when scanned and the scanned line image data of the slip can be transferred to OCR 34. In the normal character recognition process, therefore, OCR 34 can surely execute the character recognition of the transferred image data of the slip. In addition, character writing frame 41 need not be printed in a color difficult for a person to see. Further, in the normal FAX mode requiring no character recognition process, normal FAX lamp $L_F 26$ can be driven so that the image data of a transmitting original can be transmitted without problems.

Referring now to FIG. 7, the second embodiment will be explained. As the second embodiment is similar to the first embodiment, only the differences will be explained. According to the second embodiment, detector 52 instead of panel 13 is used. In accordance with the line image data from photoelectric converter 29, detector 52 outputs a selection signal to controller 12. Controller 12 selectively drives one of lamps $L_F 26$ and $L_O 27$ in accordance with the selection signal.

Initially, lamp $L_F 26$ is selected in facsimile apparatus 30. In this state, the same operation as is done by the first embodiment is executed in the FAX mode. In the character recognition mode, when reference marks 42 are read, the lamp switching is performed to use OCR lamp $L_O 27$ in accordance with the selection signal from detector 52. In the second embodiment, the position and the size of each reference mark 42 on slip 40 are determined in advance. Therefore, when the data on slip 40 is sequentially converted into line image data, the line image data is output to transmitter and detector 52. When, for example, black dots corresponding to reference marks 42 are detected from the received line image data for a few lines, the selection signal is output from detector 52 to controller 12. As a result, lamp $L_O 27$ is turned on in accordance with the OCR control signal. Thereafter, scanning of the data on slip 40 is carried out using this lamp $L_O 27$ in the same manner as is done in the first embodiment.

Referring now to FIG. 8, the third embodiment will be explained. A description of those in the third embodiment which are similar to the elements of the first embodiment will be omitted. The third embodiment does not require lamp $L_O$ 27 and driver 11. Filters 54 and 56 and drivers 18 and 19 for driving them are used instead. Filters 54 and 56 shield light with a wavelength corresponding to a drop-out color, respectively. Drivers 18 and 19 are driven in accordance with first and second control signals from controller 12', respectively. Such lamp 26' as a halogen lamp having a wavelength characteristic shown in FIG. 6, replaces lamp $L_F$ 26 as a FAX lamp. Also, driver 10 is replaced with driver 10' adopted to drive lamp 26'. Further, panel 13 is replaced with a panel 13' which has switches 14, 16 and 17 and LEDs 38, 39-a and 39-b. The operation of switch 14 turns on lamp $L_F$ 26' and LED 37. In this state, when switch 16 is operated, filter 54 is driven and when switch 17 is operated, filter 56 is driven.

When an original is fed in the facsimile apparatus in the FAX mode, lamp $L_F$ 26' is used to scan data on the original as well as the first embodiment. In the character recognition mode, filter 54 or 56 is operated with lamp $L_F$ 26' being in use. The selection of filter 54 or 56 is made according to the drop-out color in use. For instance, filter 54 is selected when the drop-out color is reddish-amber and filter 56 is selected when red. LEDs 39-a and 39-b indicate which filter is selected. When filter 54 is selected, LED 39-a lights and LED 39-b lights in another case. Upon selection of switch 16 or 17, controller 12' outputs the first or second control signal that causes driver 18 or 19 to drive its associated filter 54 or 56. Data on slip 40 is thereafter read out in the same manner as is done in the first embodiment. According to the third embodiment, since a filter has only to be selected in accordance with the drop-out color, slips with various drop-out colors can be used. Like the second embodiment, the third embodiment may use a detector in place of panel 13'.

What is claimed is:

1. A facsimile apparatus comprising:
   first light emitting means for emitting first light having a first wavelength characteristic in accordance with an incoming first control signal;
   second light emitting means for emitting second light having a second wavelength characteristic in accordance with an incoming second control signal, said second wavelength characteristic being different from said first wavelength characteristic and having substantially no intensity in a wavelength region of a drop-out color; and
   control means for selectively outputting said first control signal to said first light emitting means and said second control signal to said second light emitting means, in accordance with an incoming control command indicating whether or not a data sheet contains a pattern having the drop-out color.

2. The apparatus according to claim 1, wherein said control means includes means for outputting said second control signal to said second light emitting means in accordance with said control command, when said data sheet contains the pattern having the drop-out color.

3. The apparatus according to claim 1, wherein said first light has a spectrum in part of a visible regions.

4. The apparatus according to claim 1, further comprising:
   photoelectric conversion means for detecting said first light or second light reflected by said data sheet and for converting said detected light into an electric signal; and
   transmission means for transmitting said converted electric signal.

5. The apparatus according to claim 4, wherein said data sheet contains the pattern having the drop-out color at a predetermined position thereon, and
   wherein said apparatus further comprises detection means for outputting said control command to said control means to cause said control means to output said second control signal when a signal corresponding to said reference marks is detected in said converted electric signal.

6. A facsimile apparatus comprising:
   light emitting means for emitting first light of a first wavelength region in accordance with an incoming first control signal;
   first filter means for shielding second light of a second wavelength region from said first light in accordance with an incoming second control signal, said second wavelength region corresponding to a wavelength region of a drop-out color and being narrower than said first wavelength region; and
   control means responsive to an incoming control command for outputting said first control signal to said light emitting means and for selectively outputting said second control signal to said first filter means, the control command indicating whether or not a data sheet contains a pattern having the drop-out color.

7. The apparatus according to claim 6, wherein said control means includes means for outputting said second control signal to said filter means in accordance with said control command, when said data sheet contains the pattern having the drop-out color.

8. The apparatus according to claim 6, wherein said first wavelength region is a visible region.

9. The apparatus according to claim 6, further comprising:
   photoelectric conversion means for detecting the first light or the first light excluding said second light and for converting said detected light into an electric signal; and
   transmission means for transmitting said converted electric signal.

10. The apparatus according to claim 9, wherein said data sheet contains the pattern having the drop-out color at a predetermined position thereon, and
    wherein said apparatus further comprises detection means for outputting said control command to said control means to cause said control means to output said second control signal to said first filter means when to signal corresponding to reference marks is detected in said converted electric signal.

11. The apparatus according to claim 6, wherein said apparatus further comprises:
    second filter means for shielding third light of a third wavelength region from said first light in accordance with an incoming third control signal, the third wavelength region being different from said second wavelength region, corresponding to a wavelength region of a second drop-out color, and being narrower than said first wavelength region, and said control means further comprises means for selectively outputting the third control signal to said second filter means in accordance with the control command.

12. The apparatus according to claim 11, wherein said control means includes means for outputting said third control signal to said second filter means in accordance with said control command when said data sheet contains the pattern having the second drop-out color.

13. The apparatus according to claim 11, wherein said data sheet has reference marks having the second drop-out color, and
wherein said apparatus further comprises:
photoelectric conversion means for detecting the first light the first light excluding the second light, or the first light excluding the third light and converting said detected light into an electric signal; and
detection means for outputting said control command to said control means to cause said control means to output said second control signal to said first filter means when a signal corresponding to the pattern having the drop-out color is detected in said converted electric signal, and to cause said control means to output said third control signal to said second filter means when a signal corresponding to the pattern having the second drop-out color is detected in said converted electric signal.

14. A method for dropping out a drop-out color, comprising:

emitting first light having a first wavelength characteristic in accordance with a first control signal;
emitting second light having a second wavelength characteristic in accordance with a second control signal, said second wavelength characteristic being different from said first wavelength characteristic and having substantially no intensity in a wavelength region of a drop-out color; and
selectively generating said first and second control signals in accordance with a control command indicating whether or not a data sheet contains a pattern having the drop-out color.

15. The method according to claim 14, wherein said step of generating said first and second control signals includes generating said second control signal in accordance with said control command, when said data sheet contains a pattern having the drop-out color.

16. The method according to claim 15, wherein said data sheet contains reference marks having the drop-out color at a predetermined position thereon, and said method further comprises:
detecting said first light or second light reflected by said data sheet and converting said detected light into an electric signal; and
generating said second control signal when a signal corresponding to said reference marks is detected in said converted electric signal.

* * * * *